Patented Aug. 11, 1953

2,648,613

UNITED STATES PATENT OFFICE 2,648,613

PROTECTION OF RUBBER SURFACES

Seaphes D. Shinkle, Passaic, N. J., assignor to United States Rubber Company, New York, N. Y., a corporation of New Jersey No Drawing. Application May 25, 1951, Serial No. 228,363

2 Claims. (Cl. 117—6)

This invention relates to the protection of surfaces of rubber, i. e., natural rubber or generally similar synthetic conjugated diolefin hydrocarbon polymers, especially copolymers of such a diolefin hydrocarbon with styrene, e. g., GR–S or isoprene-styrene copolymers, against deterioration by ozone. As is well-known, ozone is perhaps the most severe deteriorating force on rubber. Any commercially feasible means which will protect rubber surfaces from attack by ozone has tremendous economic value. To date there have been many attempts to overcome the destructive action of ozone upon rubber but none of these proposals have been sufficiently economical or practical to warrant widespread commercial utilization. The present invention represents a highly successful solution of this longstanding problem.

Natural rubber, GR–S and like materials, hereinafter for convenience collectively termed "rubber," are notably poor in their resistance to attack by ozone, especially when they are kept under slight tension. This attack causes checking, cracking and ultimate breakdown of the rubber into useless oxidation products, thereby greatly shortening its possible service life. Even a slight attack may so ruin its appearance as to make it almost unsalable.

Neoprene, and rubbery copolymers of acrylonitrile, of acrylate esters of alkanols or chlorinated alkanols, or of mono-vinylpyridines, with aliphatic conjugated diolefin hydrocarbons, especially butadiene, have much better ozone resistance than does natural rubber, GR–S or the like. Therefore, it might be thought that films of these elastomers on a rubber article might protect the latter against ozone aging. Such films do improve the ozone resistance of the article, but the films are unsuitable because they have poor luster, are tacky and are easily marked by the fingernail or other sharp objects.

I have now found that the incorporation of even a small amount of a soluble, fusible phenol-formaldehyde resin in a protecting film comprising principally an elastomer selected from the group consisting of neoprene, and copolymers of acrylonitrile, alkyl acrylates, chloroalkyl acrylates or mono-vinylpyridines with aliphatic conjugated diolefin hydrocarbons, not only improves the luster of the film, makes the film tack-free and greatly improves its resistance to marking, but also unexpectedly enhances the ozone-protective effectiveness of the film. In addition, the resulting films have good elasticity.

Both modified and unmodified phenol-formaldehyde resins can be used in the operation of my invention, provided that they are compatible with the elastomers. For example, I may use an unmodified acid-catalyzed resinous product made from phenol and formaldehyde, or an alkaline-catalyzed product made from p-octylphenol and formaldehyde, or a modified product made from phenol, cardanol and formaldehyde.

The phenolic resin can be made by reacting formaldehyde in known manner with any suitable phenol which can be ordinary phenol or a homolog thereof. I prefer to use a monohydric phenol. I prefer to employ a so-called "trifunctional" phenol, i. e., one having only hydrogen in the three positions ortho and para to the phenolic hydroxyl group, such phenol being used either alone or in conjunction with a bifunctional or a monofunctional phenol. Thus, I can use simple phenol, m-cresol, sym-xylenol, alone or in conjunction with other cresols, other xylenols, p-tertiary-butyl phenol, p-amylphenol, p-octylphenol, p-phenylphenol, etc. I often employ a resin based upon a mixture of ordinary phenol and cardanol (the phenol which is obtained from cashew nut shell oil by heating). The resin sold as Durez 12686 is an example of such a resin. It will be understood that I can use any soluble, fusible phenol-formaldehyde resin which is compatible with the elastomeric copolymer. The resin can be of the so-called "novolac" type or it can be of the so-called "resol" type provided the resol-type resin is oil-soluble. Oil-soluble resols are usually made with alkylphenols of the difunctional type, e. g., p-tertiary-butyl phenol, in accordance with the teachings of Honel U. S. 1,800,295.

Neoprene (polychloroprene) and any of the elastomeric (rubbery) copolymers of acrylonitrile, acrylate esters of alkanols or chlorinated alkanols, or mono-vinylpyridenes, with aliphatic conjugated diolefin hydrocarbons, especially butadiene-1,3, which are compatible with the phenolic resin used are suitable in the operation of my invention. For example, it is well-known to the art that neoprene and acrylonitrile-butadiene elastomers are usually compatible with both modified and unmodified phenolic resins. The compatibility between phenolic resins and acrylate ester: diolefin elastomers in bulk is described in my copending patent application, Serial Number 228,361, filed of even date herewith. The compatibility between phenolic resins and monovinylpyridene: diolefin elastomers in bulk is described in the copending patent application of Lewis Y. Kiley, Serial Number 214,013, filed March 5, 1951.

The relative proportions of combined monomers in the elastomeric copolymers can vary widely. In the case of diolefin-acrylonitrile copolymers the relative proportions will generally range from 55 to 85% combined diolefin and correspondingly from 45 to 15% acrylonitrile; in the case of diolefin-acrylate ester copolymers the relative proportions will generally range from 20 to 60% diolefin and correspondingly from 80 to 40% acrylate ester; and in the case of diolefin-monovinylpyridine copolymers the proportions will usually range from 50 to 80% diolefin and correspondingly from 50 to 20% mono-vinylpyridine.

Acrylic acid esters of any alkanol or chlorinated alkanol can be copolymerized with the diolefin to form the elastomer. I especially prefer to employ the esters of the lower alkanols or lower chlorinated alkanols, such as methyl, ethyl, 2-chloroethyl, n-propyl, isopropyl, the butyls, the amyls, etc.

Any mono-vinylpyridine can be copolymerized with the diolefin to form the elastomer. The pyridine ring can be otherwise unsubstituted or it can be substituted elsewhere with an alkyl group. Examples of suitable mono-vinylpyridines are: 2-vinylpyridine, 3-vinylpyridine, 4-vinylpyridine, 2-methyl-5-vinylpyridine, 5-ethyl-2-vinylpyridine, 2-methyl-6-vinylpyridine and 2-ethyl-4-vinylpyridine.

The diolefin is usually butadiene, but it can be one of the homologs thereof, of which isoprene and piperylene are the most important.

I preferably incorporate the phenolic resin into the elastomer in an amount which ranges in weight between 5 and 100 parts per 100 parts of the elastomer. The coating is insufficiently tack-free and resistant to marking if less than 5 parts of resin is used. The coating becomes too brittle if more than about 100 parts of resin is used.

The coating is conveniently made by mixing the elastomer and resin, and any additional solid ingredients if desired for special purposes, in any conventional way known to the rubber or resin industry; e. g., on an open rubber mill or in a Banbury mixer, until the stock appears to be homogeneous. The resulting stock is then dissolved in a suitable volatile organic solvent or mixture of solvents by any usual means; e. g., by shaking or by putting it through a colloid mill. The coating is then applied to the rubber article to be protected by a brushing, dipping, spraying or spreading operation or in any other suitable manner. The solvent is then evaporated to form a continuous protective film. A plurality of coatings may be applied, each being dried before a succeeding coating is applied.

I may use any volatile organic solvent or solvent mixture in which the elastomer-phenolic resin mixture is soluble; e. g., acetone, methyl ethyl ketone, cyclohexanone, tetrahydrofuran, benzene, toluene, xylene or mixtures thereof. Mixtures of unmodified phenolic resins (made from phenol, formaldehyde and catalyst alone) and the acrylonitrile or acrylate ester copolymers with diolefins are not usually sufficiently soluble in aromatic hydrocarbons alone. Therefore, I usually make up coatings containing these materials in a ketone or tetrahydrofuran or in a mixture thereof with an aromatic hydrocarbon. Neoprene, copolymers of mono-vinylpyridines with diolefins, and modified phenolic resins are soluble in aromatic hydrocarbons. For economy, I prefer to use aromatic hydrocarbons wherever possible. The use of tetrahydrofuran as a solvent for mixtures of phenolic resins and certain of these elastomers is described in more detail in my copending application, Serial Number 228,362, filed of even date herewith.

The coating solution may be made up in any convenient concentration. I have found that concentrations of about 5–30% total solids by weight are suitable to handle. The concentration will often depend on the method of application. Thus, when the coating is to be applied by spraying I prefer to use rather dilute solutions, i. e., of a concentration in the lower portion of the given range, whereas when applied by spreading with a doctor blade I may advantageously use the more concentrated solutions.

In general, the coating is applied before the rubber base is vulcanized, when good adhesion between the coating and rubber base is desired; i. e., when the coating is to remain on the rubber throughout at least a considerable portion of its useful life. Typical articles which are thus coated according to my invention to improve their ozone resistance and/or their glossy appearance are rubber footwear, rubber covered wire, toys, hot water bottles, baby carriage tops, etc.

However, to simplify the manufacturing process I sometimes more conveniently apply the coating to a vulcanized rubber article; e. g., vulcanized latex thread.

For certain uses I prefer to apply the coating to the base material, leave them in contact for a limited time, and subsequently strip off the coating.

For example, newly manufactured tires often acquire unsightly cracks in the sidewalls due to the attack of ozone, especially after being installed on and carrying the weight of an automobile. These cracks are of two kinds; namely, many small shallow surface cracks which detract from the appearance of the tire but do little or no damage to it, and a few large deep cracks which dangerously weaken the tire in service. When the automobile is operated on the road before cracking begins the former type of cracking takes place because the rolling stresses set up will be relieved by many tiny cracks over the entire sidewall. However, when the automobile is stored in the open air or in a showroom having circulating air, without previously having been operated on the road, the stresses are worse on the lower half of the tire. They will then be relieved by the formation of a few cracks which grow continually deeper either in storage or in service. On the other hand, once the many small cracks have been formed the vehicle may be safely stored. Under these conditions the many cracks will continue to grow slowly to relieve stress, but none of them are likely to become dangerously large. Of course, an automobile manufacturer cannot operate the vehicle on the road long enough to cause the formation of the less undesirable type of cracks because of the added expense and detraction from its sales appeal as a new automobile.

Heretofore, tire manufacturers have attempted to solve this problem by incorporating a paraffin wax into the tire. The film of the wax which "blooms" to the surface protects the tire against ozone, thus preventing the formation of any cracks as long as the vehicle is not moved. Unfortunately, when the tire is flexed in service the film of wax is broken in a few places, allowing ozone to start a few cracks which soon become dangerously deep whether or not the vehicle is used subsequently.

I have now solved this problem by coating the newly manufactured tire with my zone resistant solution and removing the so-formed coating just before the tire is to be used on the road. I thereby eliminate the formation of the deep and dangerous cracks while the tire is under static load. The cracks which form later under dynamic load are of the smaller shallower type which do not shorten the normal service life of the tire. Tires treated according to my invention also retain their original attractive appearance while installed on new vehicles in the showroom. Furthermore, the coating serves to keep white sidewalls clean while being handled or shipped.

It is obvious that the removable coatings to be used in this embodiment of my invention should not have as good adhesion to the base rubber material as those which are intended to remain in contact with the base material throughout substantially all of its service life. I have found that the incorporation of a material, preferably polyvinyl chloride or a copolymer of a major proportion (usually at least 85%) of vinyl chloride and a minor proportion (generally not over 15%) of a copolymerizable monomer, e. g., vinyl acetate or vinylidene chloride, which is compatible with the phenolic resin-elastomer blend, with the coating solution greatly decreases the adhesion of the dried coating to the rubber and therefore greatly improves the strippability of the film. I prefer to apply the coating to the rubber article after vulcanizing the latter since this also greatly enhances the strippability of the dried protective film.

The amount of the vinyl chloride polymer or copolymer employed to make the film readily strippable can vary widely. Typically, I employ an amount thereof ranging from 2 to 5 times the weight of the elastomer.

Coatings containing neoprene are preferably used on darker colored articles because they discolor white or light colored articles somewhat. The other coatings used in my invention may be applied to white or colored articles alike.

I omit from my coating composition curing agents for either the phenolic resin or the elastomer because the use of such curing agents is of no advantage, and because the use of curatives for the phenolic resin, e. g., the conventional methylene-yielding agents, such as hexamethylenetetramine or paraformaldehyde, makes the final coating so brittle that it cracks upon bending and is thus impaired with respect to protective and decorative value.

The following examples illustrate the operation of my invention. All parts are by weight.

EXAMPLE 1

The following elastomer-resin solutions were made by homogeneously blending the solid materials on a mill and then shaking the blend in the solvent until a homogeneous solution was obtained. The solutions were brushed onto a vulcanized gum rubber stock and onto a vulcanized tire sidewall stock, and allowed to dry at room temperature. The coated stocks and uncoated control stocks were bent double to put them under slight tension on the outer side and tacked onto boards. They were then exposed to a high concentration of ozone in a closed container either until they cracked or until it was evident that they were highly resistant to attack. Finishes A–C are shown only for purposes of contrast with finishes D–L, which later exemplify my invention.

| | A[a] | B[a] | C[a] | D | E | F | G | H | I | J | K | L |
|---|---|---|---|---|---|---|---|---|---|---|---|---|
| Neoprene | 5 | | | 8 | | | 8 | | | 6.7 | | |
| Alpha-Vinylpyridine: butadiene copolymer [b] | | 5 | | | 8 | | | 8 | | | 6.7 | |
| Acrylonitrile: butadiene copolymer [c] | | | 5 | | | 8 | | | 8 | | | 6.7 |
| Unmodified resin [d] | | | | 2 | 2 | 2 | | | | | | |
| Modified resin [e] | | | | | | | 2 | 2 | 2 | 3.3 | 3.3 | 3.3 |
| Toluene | 95 | 95 | 76 | | | | | | | | | |
| Methyl ethyl ketone | | | 19 | | | | | | | | | |
| Tetrahydrofuran | | | | 90 | 90 | 90 | 90 | 90 | 90 | 90 | 90 | 90 |

[a] Two coats brushed on, to make the final coating comparable in total solids to the single coats of D–L.

[b] Emulsion copolymer, feed ratio of alpha-vinylpyridine: butadiene 25:75, Mooney viscosity 49.

[c] Hycar O R–15 made by B. F. Goodrich Chem. Co., and containing 40% acrylonitrile.

[d] A mixture of 1,410 parts of phenol and 1,020 parts of 37% formalin was heated with agitation to 95° C., whereupon a solution of 7.5 parts of oxalic acid in 240 parts of water was added. The mixture was agitated until the exothermic reaction was ended whereupon 21 parts of concentrated hydrochloric acid were added, and the stirring continued for several hours longer while holding the temperature at 95° C. The resulting reaction mixture was dried by passing superheated steam through it until the pot temperature rose to 185° C. The cooled resin was found to have a softening point on the Dennis bar of 110–112° C., and a stroke cure time of 1 minute 50 seconds when using 85 parts of resin, 15 parts of hexamethylenetetramine and 2 parts of calcium hydroxide.

[e] Durez 12686, a commercial resin made from phenol, cardanol and formaldehyde.

Finishes A to C were tacky, had poor luster and were easily scratched by the fingernails. In contrast, finishes D to L were tack-free and flexible and had good luster, resistance to scratching, and adhesion to the base stock.

The table shows the time of exposure to ozone required to cause cracking. When the test was stopped at the end of 6 hours and 45 minutes many of the test pieces had not cracked.

*Time required to crack in ozone*

| Finish | Gum Base Stock | Sidewall Base Stock |
|---|---|---|
| None | 10 min | 10 min |
| A | More than 405 min | 90 min |
| B | 60 min | 60 min |
| C | do | 225 min |
| D | 165 min | 60 min |
| E | More than 405 min | More than 405 min |
| F | do | Do |
| G | do | 150 min |
| H | do | More than 405 min |
| I | 225 min | Do |
| J | More than 405 min | Do |
| K | 2 very small cracks in 405 min | Do |
| L | More than 405 min | Do |

The table shows the remarkable improvement in resistance to ozone cracking effected by coating the base stock. It is also apparent that finishes D–L, which contain phenolic resins according to the teaching of my invention, with few minor exceptions protect the base stock against ozone cracking considerably longer than do finishes A–C, which do not contain the resins and thus are not the subject of my invention.

EXAMPLE 2

A standard rubber shoe upper stock was mixed and calendered, and portions were brushed with coatings A–L shown in Example 1. The coated stock and an uncoated portion of the same stock were vulcanized in ammonia as done conventionally in the rubber industry. Strips from the vulcanized stocks were then bent double and subjected to the action of ozone as described in Example 1. The stocks coated with finishes A–L did not crack in 7½ hours (450 minutes) exposure to ozone, whereas the uncoated control stock cracked in 6 minutes. However, finishes A–C gave a tacky, easily scratched finish of poor appearance, while finishes D–L which are the subject of my invention were free from these defects.

EXAMPLE 3

The unvulcanized footwear stock of Example 2 was coated with the following finishes, vulcanized as in Example 2 and tested as in Example 1.

|  | M | N | O | P | Q | R |
|---|---|---|---|---|---|---|
| Hycar OR-15 | 9.1 | 8.3 | 9.1 | 8.3 | 6.7 |  |
| Neoprene |  |  |  |  |  | 6.7 |
| Durez 12686 | 0.9 | 1.7 |  |  |  |  |
| Amberol ST-137 a |  |  | 0.9 | 1.7 | 3.3 | 3.3 |
| Methyl ethyl ketone | 90 | 90 | 90 | 90 | 90 |  |
| Toluene |  |  |  |  |  | 90 | a An oil-soluble resol made from about 1 mol p-octylphenol, 2 mols formaldehyde and 1 mol sodium hydroxide.

The uncoated control stock cracked within 20 minutes' exposure to ozone, whereas stocks M to R inclusive had not cracked when the test was discontinued after 2 hours exposure to ozone.

EXAMPLE 4

A vulcanized gum stock was coated with the following finishes and tested as in Example 1.

|  | S | T | U | V | W |
|---|---|---|---|---|---|
| Methyl acrylate: butadiene copolymer a | 10 | 9.1 | 8.3 | 9.1 | 8.3 |
| Unmodified resin b |  | 0.9 | 1.7 |  |  |
| Modified resin b |  |  |  | 0.9 | 1.7 |
| Toluene | 90 |  |  |  |  |
| Tetrahydrofuran |  | 90 | 90 | 90 | 90 | a Emulsion copolymer, feed ratio of methyl acrylate : butadiene of 61 : 39 by weight, 76% conversion.
b Described in Example 1.

Finish S was tacky, was easily marked and had poor luster. Finishes T to W, which illustrate my invention, were tack-free and had good luster and resistance to marking.

| Finish | Time Required to Crack in Ozone, Minutes |
|---|---|
| None | 6 |
| S | 10 |
| T | 20 |
| U | 60 |
| V | 30 |
| W | 20 |

It is evident that the finishes (T–W) of my invention protect the base stock longer against ozone than does the acrylate ester:butadiene copolymer finish (S) alone.

EXAMPLE 5

The following mixture exemplifies a typical formulation made up for use on vulcanized tire sidewalls between the time of manufacture and the time when the vehicle on which they are used goes into service. The coating is then stripped off without difficulty, thus retaining the original attractive appearance of the tire.

| | |
|---|---|
| Durez 12686 | 3.77 |
| Hycar OR-15 | 3.77 |
| Vinylite VYNS a | 11.33 |
| Methyl ethyl ketone | 66.92 |
| Cyclohexanone | 14.21 | a A vinyl chloride : vinyl acetate copolymer containing 88.5–90.5% vinyl chloride and 11.5–9.5% vinyl acetate.

This solution may be thinned with toluene to make it easier to spray. The vinyl copolymer reduces adhesion of the coating to the tire.

From the foregoing many advantages of the present invention will be apparent to those skilled in the art. The principal advantage is that the invention provides a simple and commercially feasible method of protecting the surface of rubber articles against the destructive action of ozone. Another advantage is that the invention provides an ozone-protective finish which is flexible and elastic so that it adheres well to the rubber article despite flexing of such article during service. Another advantage is that the ozone-protective films of the invention have good luster, thereby adding to the attractiveness of the articles being protected, are free from tackiness and are resistant to marking during service. Another advantage is that the coating compositions used in accordance with the invention are easily prepared and applied to rubber or like articles to be protected against ozone. Another advantage is that the invention provides a means of obtaining excellent adhesion of the protective film by providing for application of the coating composition to the unvulcanized article followed by vulcanization thereof. Another advantage is that the invention provides a simple and economical way of temporarily protecting vulcanized rubber articles against ozone deterioration, the coating being readily strippable from the protected article when it is to be placed in service. This embodiment of my invention is particularly valuable for protecting vulcanized tire sidewalls against ozone attack between the time of manufacture and the time when the vehicle on which they are used is placed in service, the coating being easily stripped off at the latter time. Numerous other advantages of my invention will be apparent to those skilled in the art.

Having thus described my invention, what I claim and desire to protect by Letters Patent is:

1. The method of temporarily protecting the surface of a vulcanized rubber article which normally is objectionably deficient in resistance to surface attack by ozone against such attack which comprises applying thereto a coating of a solution consisting essentially of an elastomer selected from the group consisting of polychloroprene, copolymers of from 55 to 85% combined aliphatic conjugated diolefin hydrocarbon and correspondingly from 45 to 15% combined acrylonitrile, copolymers of from 20 to 60% combined aliphatic conjugated diolefin hydrocarbon and correspondingly from 80 to 40% combined acrylate ester selected from the group consisting of alkyl and chloroalkyl acrylates, and copolymers of from 50 to 80% combined aliphatic conjugated diolefin hydrocarbon and correspondingly from 50 to 20% combined mono-vinyl pyridine, a soluble, fusible phenol-formaldehyde resin compatible with said elastomer, the amount of said resin being equal to from 5 to 100 parts per 100 parts of said elastomer, and a vinyl resin selected from the group consisting of polyvinyl chloride and copolymers of a major proportion of vinyl chloride and a minor proportion of a copolymerizable monomer, the amount of said vinyl resin being equal to from 2 to 5 times the weight of said elastomer, dissolved in a volatile organic solvent to a total solids level of from 5 to 30%, said solution being free from curing agents for said elastomer and curing agents for said phenol-formaldehyde resin, evaporating said solvent to form a thin, continuous, ozone-protective, tack-free, lustrous, mark-resistant, flexible film which is readily strippable from said surface, and subsequently stripping said film from said surface.

2. The method of temporarily protecting the surface of a vulcanized rubber pneumatic tire sidewall which normally is objectionable in resistance to attack by ozone against such attack which comprises applying thereto a coating of a solution consisting essentially of a rubbery copolymer of from 55 to 85% combined butadiene and correspondingly from 45 to 15% acrylonitrile, a soluble, fusible phenol-formaldehyde resin compatible with said copolymer, the amount of said resin being approximately equal to the amount of said copolymer, and a copolymer of a major proportion of vinyl chloride and a minor proportion of vinyl acetate, the amount of said last-named copolymer being equal to approximately three times the amount of said rubbery copolymer, dissolved in a volatile organic solvent to a total solids level of from 5 to 30%, said solution being free from curing agents for said rubbery copolymer and curing agents for said phenol-formaldehyde resin, evaporating said solvent to form a thin, continuous, ozone-protective, tack-free, lustrous, mark-resistant, flexible film which is readily strippable from said surface, and subsequently stripping said film from said surface.

SEAPHES D. SHINKLE.

References Cited in the file of this patent

UNITED STATES PATENTS

| Number | Name | Date |
|---|---|---|
| 2,243,185 | Bacon et al. | May 27, 1941 |
| 2,308,724 | Stamberger | Jan. 19, 1943 |
| 2,333,887 | Redlinger | Nov. 9, 1943 |
| 2,336,792 | Langkammerer et al., | Dec. 14, 1943 |
| 2,431,684 | Drophy | Dec. 2, 1947 |
| 2,459,739 | Groten et al. | Jan. 18, 1949 |
| 2,485,097 | Howland et al. | Oct. 18, 1949 |

FOREIGN PATENTS

| Number | Country | Date |
|---|---|---|
| 610,345 | Great Britain | Oct. 14, 1948 |
| 947,204 | France | June 27, 1949 |